United States Patent [19]

Kesl et al.

[11] 4,238,916
[45] Dec. 16, 1980

[54] CORN SNAPPING HEADER FRAME

[75] Inventors: Elmer M. Kesl, Downers Grove; Henry H. Quade, Palos Heights; Peter Sammarco, Downers Grove, all of Ill.

[73] Assignee: International Harvester Company, Chicago, Ill.

[21] Appl. No.: 64,145

[22] Filed: Aug. 6, 1979

[51] Int. Cl.³ ..................... A01D 45/02; A01D 45/00
[52] U.S. Cl. .......................................... 56/106; 56/104
[58] Field of Search ................. 56/105, 106, 103, 104, 56/107, 108, 109, 110, 111, 112, 113–115, 14.1, 14.2

[56] References Cited

U.S. PATENT DOCUMENTS

| 1,928,868 | 10/1933 | Poen | 56/127 |
| 1,936,760 | 11/1933 | Hitchcock | 56/103 |
| 3,589,110 | 6/1971 | Schreinerer et al. | 56/106 |
| 4,084,396 | 4/1978 | Fritz et al. | 56/98 |
| 4,086,749 | 5/1978 | Greiner et al. | 56/106 |

OTHER PUBLICATIONS

International Harvester Co., Operators Manual No. 1012996R1 Rev. 2, 11/74.

Primary Examiner—Paul J. Hirsch
Attorney, Agent, or Firm—Dennis K. Sullivan; Neal C. Johnson; F. David AuBuchon

[57] ABSTRACT

A corn snapping header frame having transverse beam assemblies pivotally mounted at each end of a transverse main frame, the transverse beams being forwardly offset from the frame and having corn snapping units mounted thereon.

6 Claims, 4 Drawing Figures

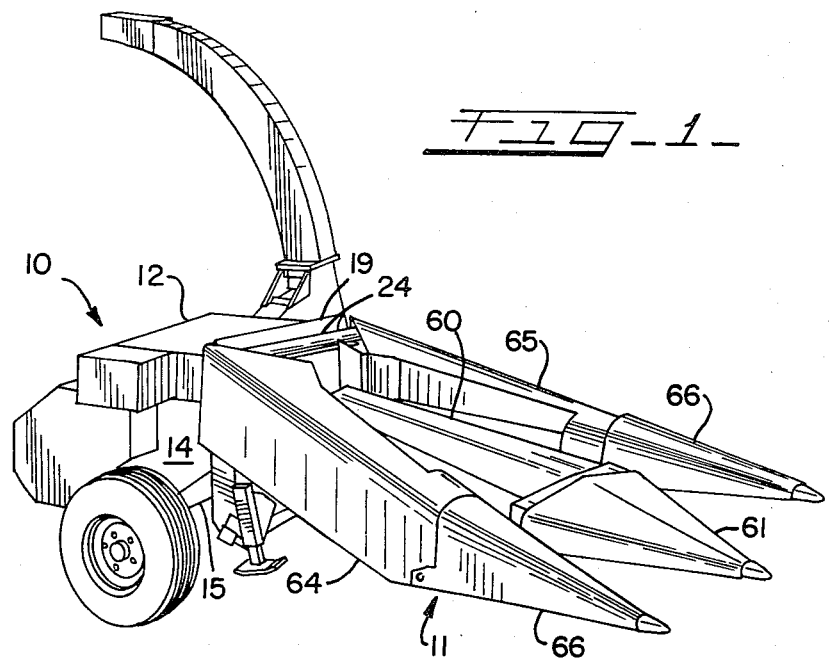
FIG-1-
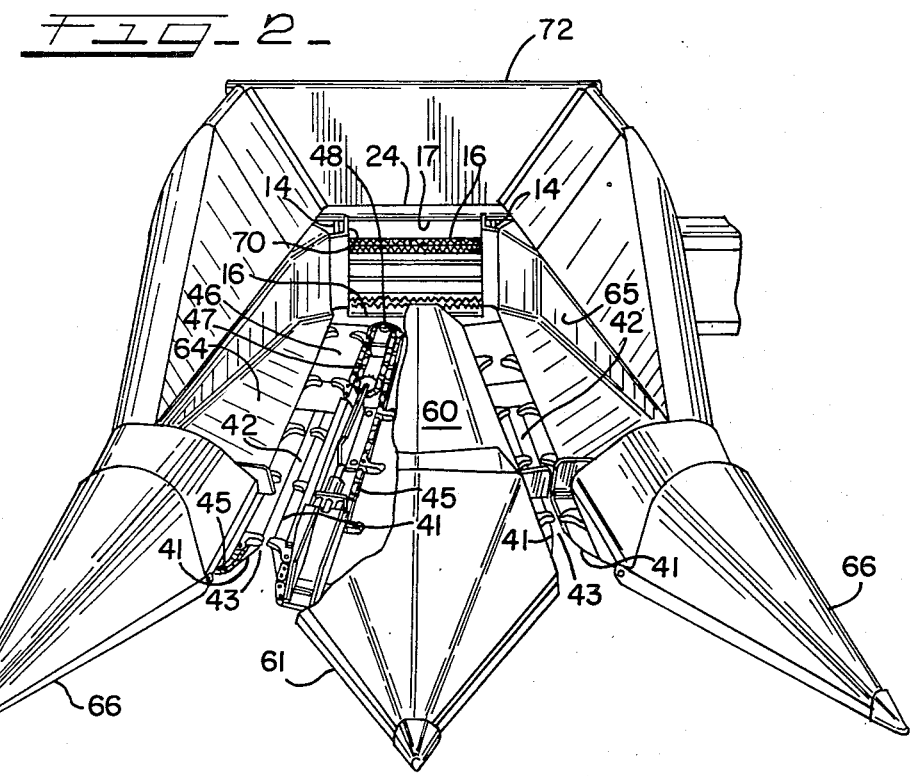
FIG-2-

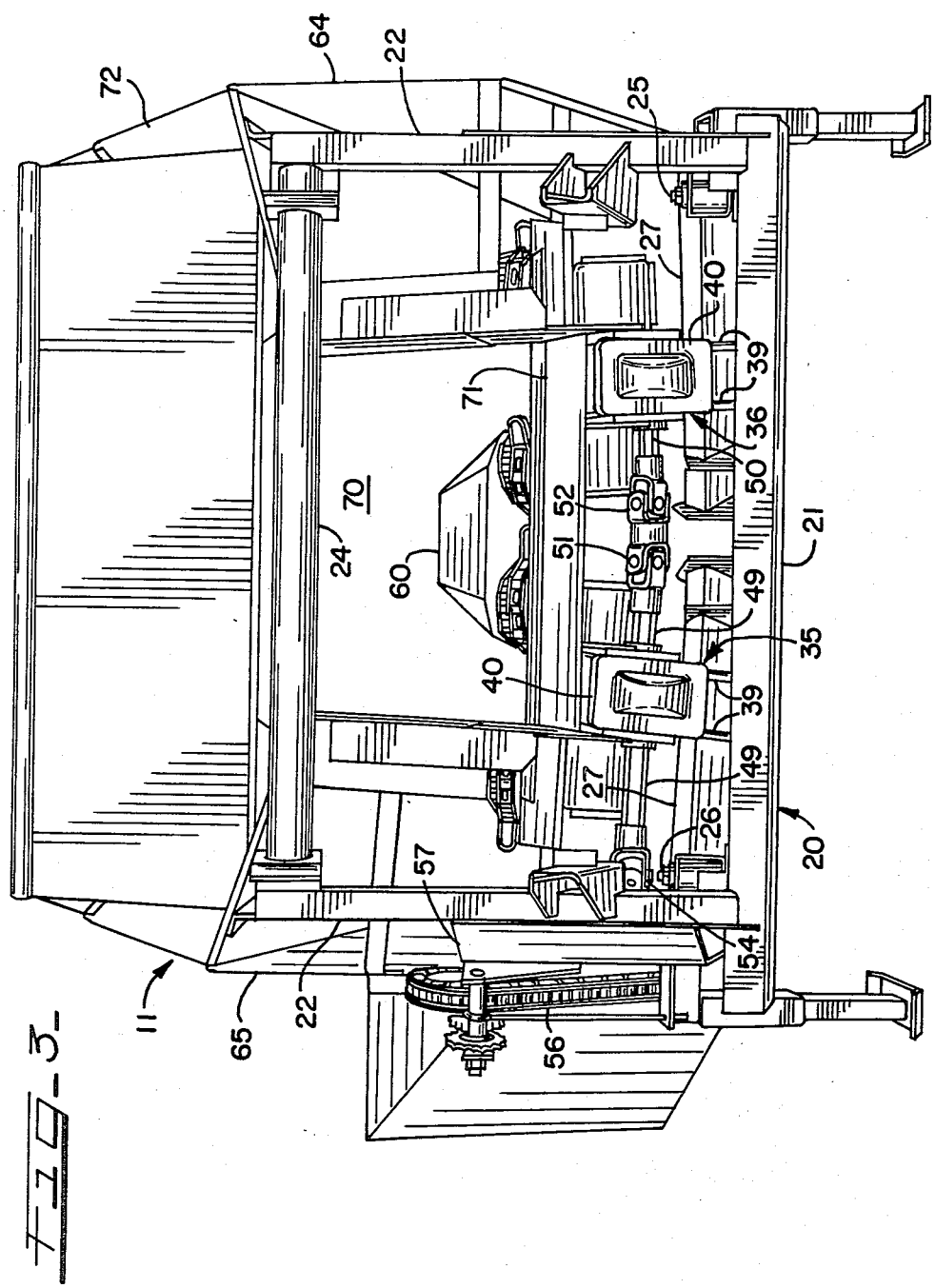

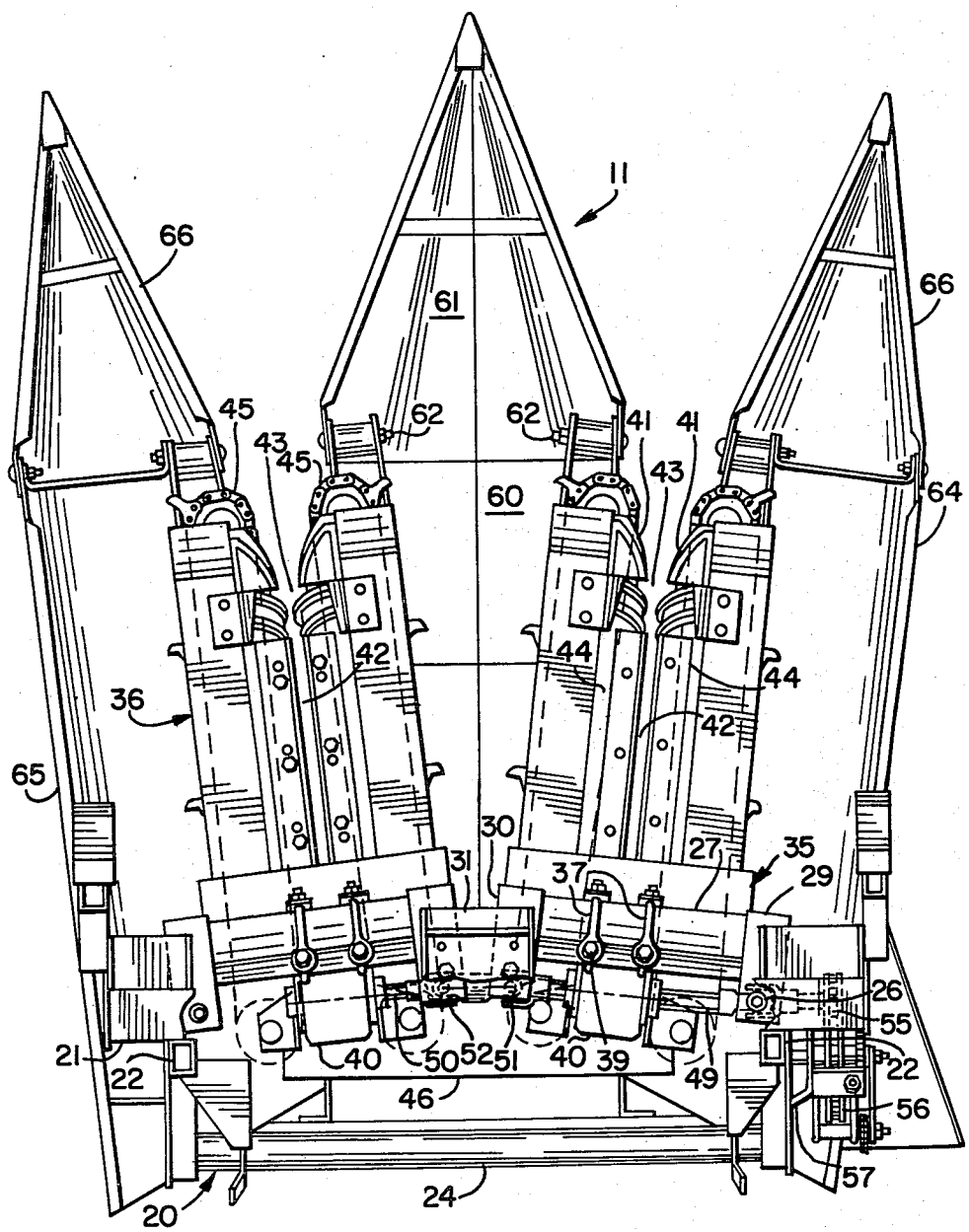

CORN SNAPPING HEADER FRAME

CROSS REFERENCE TO RELATED APPLICATION

This application is related to application Ser. No. 064,146, entitled FORAGE HARVESTER CORN SNAPPING HEADER, by Elmer M. Kesl, Thomas J. Scarnato, and Peter Sammarco on Aug. 6, 1979 and assigned to the assignee hereof.

BACKGROUND OF THE INVENTION

This invention relates to corn snapping headers of the type used for removing ears from standing corn stalks and, more particularly, to a header primarily intended for use in conjunction with a forage harvester, incorporating a novel frame permitting the use of combine corn snapping units while providing swingable row adjustability.

Previous snapping headers for forage harvesters are essentially a two row version of a combine corn header and have included a pair of laterally adjustable corn snapping units mounted on a transverse beam as shown on a combine header in Schreiner et al. U.S. Pat. No. 3,589,110. In these snapping units, the crop passage defined by the snapping plates is disposed parallel to the path of travel so that the planted stalk moves rearwardly in the passage. The corn ears are snapped off in the passages and move rearwardly into a cross auger trough and then laterally by the cross auger to the center outlet of the header.

In the referenced copending application, Ser. No. 064,146, there is claimed a corn snapping header wherein the crop passages of the snapping units are disposed at an angle to the path of travel thereby eliminating the cross auger structure. However, it is also desirable for the structure to be capable of having the rows swingingly adjustable in a manner similar to that used in a row crop harvesting unit, as shown for example, in U.S. Pat. No. 4,084,396 to Fritz et al. while at the same time using the normally laterally adjustable combine snapping units.

SUMMARY OF THE INVENTION

Accordingly, it is the primary object of the invention described and claimed herein to provide a frame for pivotal adjustment of the crop rows while facilitating the use of standard combine snapping units.

The above object is specifically met in a multirow corn snapping header having a main transverse framework extending transversely across all rows, a transverse beam assembly having a first end pivotally mounted about a generally vertical axis adjacent each end of the framework and a second end adapted to be attached to the middle portion of the framework, the medial portion of the transverse beam being forwardly offset at an obtuse angle to the direction of travel. Corn snapping units are mounted on the transverse beam and are preferably driven by a single transverse driveline having a universal joint in line with the pivot axis of the transverse beam. The snapping header is intended primarily for use with a forage harvester; however, the transverse beam assemblies could be used on the outer rows of a multirow combine corn head.

DETAILED DESCRIPTION OF THE DRAWINGS

Other objects and advantages will become apparent upon reading the detailed description of the invention and upon reference to the drawings, in which:

FIG. 1 is a perspective view of a forage harvester snapping header combination embodying our invention;

FIG. 2 is an enlarged fron view of the snapping header of FIG. 1, a portion of the sheet metal being removed to expose the underlying parts;

FIG. 3 is a rear view of the snapping header shown in FIG. 2; and

FIG. 4 is a bottom view of the snapping header of FIG. 2.

DETAILED DESCRIPTION OF THE PREFERRED EMBODIMENT

Turning to the drawings, there is shown in FIG. 1, a forage harvester generally designated 10 provided with a corn snapping header generally 11. The forage harvester 10 is of the type shown (with a hay pickup header) in U.S. Pat. No. 4,133,165 and includes a fore-and-aft extending crop housing 12 including side sheets 14 disposed on the wheel supported forage harvester frame 15 and having a rotary reel cutterhead thereinside for chopping crops against a stationary shear bar in the well known manner. A plurality of transversely extending crop infeed rolls 16 are disposed in the forwardly facing crop inlet 17 of the housing 12, the forwardmost roll preferably extending slightly forwardly thereof as shown in the above referenced patent.

Forwardly of the housing 12, the corn snapping header 11 is mounted to the frame of the forage harvester as by an intermediate yoke 19. The details of the mounting are not important to the present invention except for the alignment of the crop inlet 17 and the snapping header rear outlet. The mounting details may be had by reference to the above-referenced patent and to U.S. Pat. No. 4,067,176.

Turning to FIGS. 3 and 4, the snapping header 11 comprises a transverse main frame assembly 20 including a generally vertical integral rectangular framework formed by lower beam 21, upright side beams 22, and the cross bar 24, the latter being carried by the yoke 19 when the snapper header is attached to the forage harvester 11. Pivotally mounted to the lower beam 21 adjacent the outer ends about generally vertical but somewhat forward leaning axes as at 25 and 26 are left and right swingable transverse beam assemblies 27 which are forwardly offset from the pivots 25, 26 by arms 29. The transverse beam assemblies 27 extend toward the lateral center of the snapping header to inward ends which are provided with suitable rearwardly extending brackets 30 having a plurality of holes for bolt attachment to center bracket 31 attached to the center of lower cross beam 21 with the beams at an obtuse angle to the direction of travel but so that the angle of the beams relative to the frame 20 can be varied to adjust row spacing.

A left and a right corn snapping unit 35, 36 are clamped to the respective transverse beams 27 by eye bolts 37 and bolts 39 which attach to the gear housings 40 of the snapping units 35, 36, the snapping units 35, 36 extending forwardly at a downward angle. Combine corn header snapping units, such as used on the 800 Series Corn Heads manufactured by International Harvester Company except, for a modification in the gathering chain structure as will hereinafter be seen, are preferred. These units are similar to those illustrated in Schreiner et al. U.S. Pat. No. 3,589,110 and each comprises the gear housing 40 and framework to which forwardly extending parallel pairs of fixed snapping plates 41 are attached, the snapping plates 41 defining the elongated crop passage 42 having a forward stalk entry end 43 which is perpendicular to the transverse beam 27 as shown in FIG. 4. Disposed below the snapping plates 41 on either side of the crop passage are cooperative counterrotating snapping rolls 44 which grab the plant stalks and pull them through the snapping plates 41 to remove the ears. Disposed above the snapping plates 41 are lugged gathering chains 45 which run alongside each side of the crop passage 42 from the adjacent forward stalk entry 43 of the passage 42 rearwardly to the area adjacent the forage harvester feed rolls 16 in the crop inlet 17. The stripping units 35, 36 are modified in this regard in that an additional floor sheet 46 is present in the snapping header 11 adjacent the rear outlet and the gathering chains 45 are rearwardly extended thereacross by use of an extra chain 47 and countershaft 48 as shown in FIG. 2. The snapping rolls 44 and the gathering chains 45 for each unit derive their drive through the gear boxes 40 which are in turn driven by single drive shafts 49, 50, each of which extend at right angles to the crop passages 42 or parallel to the respective transverse beams 27. The drive shafts 49 and 50 are connected by a flexible shaft means, preferably the two universal joints 51, 52 to form a single drive line which extends leftward to another universal joint 54 located in direct alignment with the pivot 26 of the transverse beam, and continues to a sprocket 55 rotatably mounted on a bracket 57 attached to the left frame member 22 and driven by a chain drive 56 which is in turn connected to the reversible forage harvester drive system by a chain (not shown) in a conventional manner.

A central sheet metal divider structure 60 is attached to the inner sides of the snapping units 35, 36 to cover the area therebetween, the sheet metal being telescoping to accommodate row spacing changes. Similarly telescoping is the forward center divider point 61 which pivots vertically about its attaching points 62 to follow the ground contour. The outer sides of the snapping units 35, 36 are provided respectively with sheet metal outer dividers 64, 65 which extend rearwardly from vertically swingable divider tips 66, the crop passage sides of the dividers 64, 65 extending across the rear of the snapping header 11 to define a single rear outlet 70 beneath the cross bar 24, which is the same width or preferably slightly narrower than the forage harvester crop inlet 17 and is in transverse registry therewith. The floor plate 46 is provided with a hinged extension 71 to prevent corn ears from escaping from the feed rolls 16 which are immediately rearward of the outlet 70. As shown in FIGS. 2 and 4, the outer dividers 64 and 65 may optionally be provided with a sheet metal upper extension 72 for preventing the loss of ears from tall stalks. The corn snapper may also be provided with a beater rotating about a transverse axis forwardly of the rear inlet to push the crops rearwardly. Such beaters are shown, for example, in U.S. Pat. No. 3,192,694. It will be appreciated that due to the adjustment of the transverse beams 27, the transverse spacing of the stalk entries 43 to the crop passages 42 may be varied from the wide spacing, commonly 36"–40", to the narrow crop spacing, commonly 28"–32". In either case, the spacing between the stalk entries of the crop passages is greater than the width of the forage harvester crop inlet.

Thus, there has been provided in accordance with the invention a corn snapping header which fully satisfies the objects and advantages set forth above. In view of the above disclosure, those of skill in the art will recognize that changes and modifications can be made while still practicing our teachings. Accordingly, it is intended to embrace such modifications as fall with the scope of the appended claims.

What is claimed is:

1. A two row corn snapping header for use in combination with a forage harvester comprising:

a main frame including beam extending at right angles to the path of travel of said harvester across both rows;

left and right transverse beam assemblies, each of said assemblies having a first end pivotally mounted on said main frame beam for swinging about a generally vertical axis and a second end attachable to said frame beam in one of a plurality of positions, the portion of said beam assembly between said first and second ends being a transverse beam forwardly offset from said main frame beam at an obtuse angle to the path of travel of said harvester;

a corn snapping unit mounted on each of said transverse beam assemblies and having a crop passage disposed perpendicularly of said transverse beam for receiving corn stalks, said corn snapping units having means for removing the corn ears from the stalks and for moving them rearwardly to said forage harvester, and means operatively associated with said forage harvester for driving said snapping units.

2. A multi-row corn snapping header comprising:

a main frame extending transversely across all rows;

a transverse beam assembly having a first end pivotally mounted adjacent the end of said transverse frame about a generally vertical axis and a second end adapted to be attached to a laterally inner portion of said frame, the medial portion of said beam assembly being a transverse beam forwardly offset from said main frame at an obtuse angle to the direction of travel, a corn snapping unit mounted on said transverse beam and having a crop passage for receiving corn stalks, said snapping unit having means for removing ears from said corn stalks, and moving said ears rearwardly, and means for driving said snapping unit.

3. The invention in accordance with claim 2 and a second transverse beam assembly pivotally mounted at the other end of said frame in the same manner as said transverse beam assembly, and a second corn snapping unit being mounted on said second transverse beam assembly.

4. The invention in accordance with claim 1 or claim 3 and a single transverse driveline extending laterally across said rows for driving said snapping units, and universal joint means being disposed in said driveline between said snapping units.

5. The invention in accordance with claim 4 and said driveline extending transversely beyond one of said snapping units to a fixed rotatable mounting on said frame and a universal joint disposed between said one snapping unit and said rotatable fixed mounting.

6. The invention in accordance with claim 5 and said universal joint between said one snapping unit and said fixed rotatable mounting lying on the pivot axis of said transverse beam assembly mounting said snapping unit.

* * * * *